(12) United States Patent
Murari et al.

(10) Patent No.: US 6,779,247 B1
(45) Date of Patent: Aug. 24, 2004

(54) METHOD OF PRODUCING SUSPENDED ELEMENTS FOR ELECTRICAL CONNECTION BETWEEN TWO PORTIONS OF A MICROMECHANISM WHICH CAN MOVE RELATIVE TO ONE ANOTHER

(75) Inventors: Bruno Murari, Milan (IT); Benedetto Vigna, Potenza (IT); Ubaldo Mastromatteo, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 153 days.

(21) Appl. No.: 09/676,017

(22) Filed: Sep. 29, 2000

(30) Foreign Application Priority Data

Oct. 1, 1999 (EP) .............................................. 99830620

(51) Int. Cl.[7] ........................ G11B 5/127; H01L 21/311
(52) U.S. Cl. ................................ 29/603.01; 29/603.12; 438/700; 438/706; 438/745
(58) Field of Search ............................... 438/745, 706, 438/689, 690, 700, 704

(56) References Cited

U.S. PATENT DOCUMENTS

| | | | | | |
|---|---|---|---|---|---|
| 5,025,346 A | * | 6/1991 | Tang et al. | ............... | 361/283.1 |
| 5,028,983 A | * | 7/1991 | Bickford et al. | ............ | 257/668 |
| 5,454,158 A | | 10/1995 | Fontana, Jr. et al. | .......... | 29/603 |
| 5,523,619 A | * | 6/1996 | McAllister et al. | ......... | 257/469 |
| 5,686,697 A | * | 11/1997 | Miller et al. | ................ | 174/52.2 |
| 5,822,856 A | * | 10/1998 | Bhatt et al. | ................. | 174/262 |
| 6,178,093 B1 | * | 1/2001 | Bhatt et al. | ................. | 174/255 |

FOREIGN PATENT DOCUMENTS

| | | |
|---|---|---|
| EP | 0 913 921 | 5/1999 |
| JP | 06-151998 | 5/1994 |
| JP | 07-092687 | 4/1995 |
| JP | 07-167885 | 7/1995 |
| JP | 08-140368 | 5/1996 |
| JP | 10-086392 | 4/1998 |
| JP | 11-207962 | 8/1999 |
| WO | WO 99/37013 | 7/1999 |

* cited by examiner

*Primary Examiner*—Nadine G. Norton
*Assistant Examiner*—Duy-Vu Deo
(74) *Attorney, Agent, or Firm*—Lisa K. Jorgenson; E. Russell Tarleton; Seed IP Law Group PLLC

(57) ABSTRACT

A method of producing suspended elements for electrical connection between two portions of a micro-mechanism that can move relative to one another provides for the formation of a layer of sacrificial material, the formation of the electrical connection elements on the layer of sacrificial material, and the selective removal of the layer of sacrificial material beneath the electrical connecting elements, the layer of sacrificial material being a thin film with at least one adhesive side that can be applied dry to the surface of the micro-mechanism.

14 Claims, 12 Drawing Sheets

US 6,779,247 B1

METHOD OF PRODUCING SUSPENDED ELEMENTS FOR ELECTRICAL CONNECTION BETWEEN TWO PORTIONS OF A MICROMECHANISM WHICH CAN MOVE RELATIVE TO ONE ANOTHER

TECHNICAL FIELD

The present invention relates in general to the field of micro-mechanics, especially to the field of micro-actuators, and particularly but not exclusively to micro-actuators used for the fine positioning of reading/writing heads in hard-disk reading/writing units. More specifically, the invention relates to a method of producing suspended elements for electrical connection between two portions of a micro-mechanism that can move relative to one another, for example, for electrically connecting the reading/writing head, which is fixed to the rotor of the micro-actuator, to the static portion of the micro-actuator.

BACKGROUND OF THE INVENTION

A known hard-disk reading/writing unit, comprises a support body (called "E-block") rotated by an electric motor and having a plurality of arms, each carrying a suspension element formed by a cantilevered plate the free end of which carries, by means of a coupling ("gimbal"), a reading/writing transducer (head or "slider") which faces a surface of the hard disk. The slider may be coupled to the gimbal with the interposition of a micro-actuator produced by micro-processing of a semiconductor wafer.

These reading/writing units enable the density of tracks on the hard disk to be increased by permitting a first positioning by the motor acting on the support body and a fine positioning by the action of the micro-actuator on the slider.

However, a problem arises in fixing the slider to the rotor of the micro-actuator and in electrically connecting the electrical terminals of the slider (of which there are at least four, two for reading and two for writing) without giving rise to interference with the movement of the slider.

In view of the foregoing, the disclosed embodiments of the present invention provide a method of producing suspended elements for electrical connection between two portions of a micro-mechanism that can move relative to one another.

SUMMARY OF THE INVENTION

According to the embodiments of the present invention, a method of producing suspended elements for electrical connection between two portions of a micro-mechanism that can move relative to one another provides for the formation of a layer of sacrificial material, the formation of the electrical connection elements on the layer of sacrificial material, and the removal of the layer of sacrificial material beneath the electrical connection elements. The layer of sacrificial material is a thin film with at least one adhesive side that can be applied dry to the surface of the micro-mechanism.

BRIEF DESCRIPTION OF THE DRAWINGS

The features and the advantages of the disclosed embodiments of the present invention will become clearer from the following detailed description of a practical embodiment thereof, illustrated purely by way of non-limiting example, in the appended drawings, in which.

DETAILED DESCRIPTION OF THE INVENTION

Figure 1:
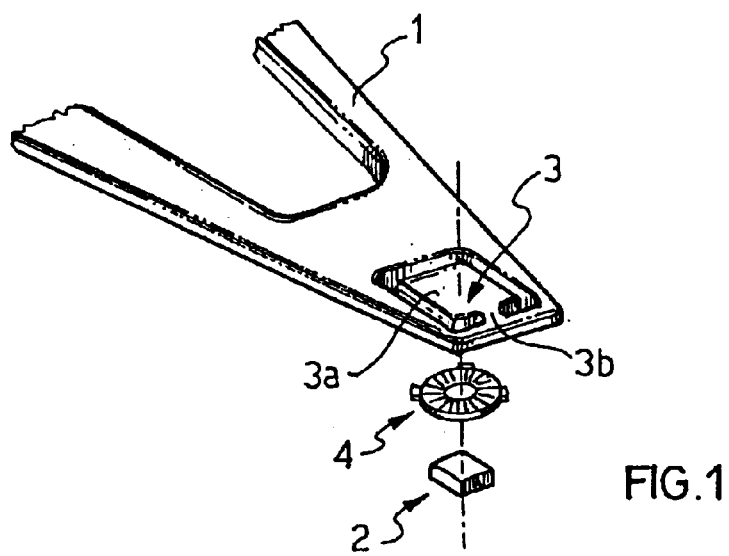
FIG. 1 is an exploded view of a detail of a hard-disk reading/writing unit with micrometric actuation.

With reference to FIG. 1, this shows the detail of the end portion of a suspension plate 1 for a hard-disk reading/writing transducer (head or "slider") 2. The suspension plate 1 is supported, in known manner, by a respective arm of an "E"-shaped support ("E-block"), not shown, which is rotated by an electric motor ("voice coil motor"), likewise not shown. The slider 2 is fixed to the suspension plate 1 by means of a coupling 3 (called "gimbal"), generally formed by the suspension plate 1 and constituted, for example, by a small rectangular plate 3a which is cut from the suspension plate on three and a half sides and of which the portion 3b which is connected to the suspension plate 1 allows the small plate 3a to bend under the effect of the weight of the slider 2. A rotary micro-actuator 4 interposed between the slider 2 and the coupling 3 is also shown schematically. The micro-actuator 4 is operated by an electronic control unit to permit fine positioning of the slider over the tracks of the hard disk, correcting the positioning errors caused by the voice coil motor.

The micro-actuator 4 is, for example, of the type described in the Applicant's European patent application EP0913921. The micro-actuator 4 is made of polysilicon in a semiconductor chip, for example, by the method described in the above-referenced European patent application.

Figure 2:
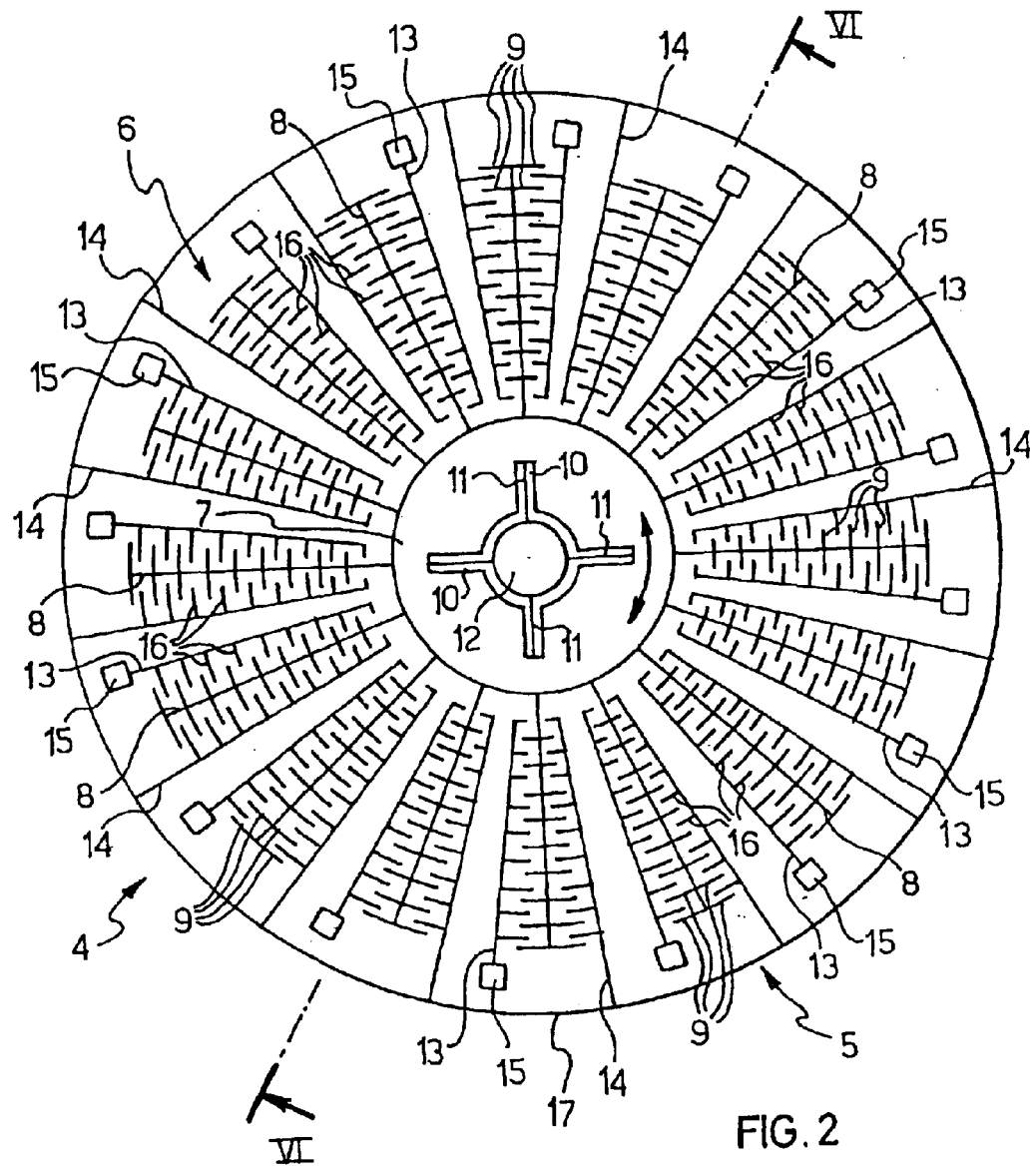
FIG. 2 is a schematic plan view of a micro-actuator for the unit of FIG. 1.

FIG. 2 is a schematic plan view of the micro-actuator 4. An outer stator 5 and an inner rotor 6 are visible. The stator 5 is intended to be connected rigidly to the small plate 3a of the gimbal 3, together with the other components incorporated in the semiconductor chip in which the micro-actuator 4 is formed. The rotor 6, which is coupled capacitively with the stator, is intended to be fixed to the slider 2 in the manner which will be described in detail below.

The rotor 6 comprises a substantially annular suspended mass 7 and a plurality of movable arms 8 which are also suspended and extend radially outwards from the suspended mass 7. Each movable arm 8 carries a plurality of movable electrodes 9 extending substantially perpendicular to the movable arm 8 on both sides thereof.

The suspended mass 7 has four annular slots 10 that extend radially from the inner boundary of the suspended mass 7 and within which four resilient suspension and anchoring elements 11 known as springs extend, connecting the suspended mass 7 resiliently and electrically to an anchoring pillar 12 concentric with the suspended mass 7 but fixed. The pillar 12, the springs 11, the suspended mass 7, the movable arms 8, and the movable electrodes 9 are made of epitaxial polysilicon suitably doped so as to be highly conductive. The pillar 12 enables the movable electrodes 9 of the rotor 6 to be polarized via a buried conductive region, not visible in FIG. 2.

The stator 5 comprises a plurality of first fixed arms 13 and a plurality of second fixed arms 14. Each first fixed arm 13 extends radially on the left-hand side of a respective movable arm 8, from a respective first fixed region 15. The fixed regions 15 are disposed peripherally around the rotor 6 and are connected to one another electrically by means of buried or surface connections, not shown, in order to polarize the first fixed arms 13 to a first voltage. The second fixed arms 14 extend radially on the right-hand sides of the respective movable arms 8 from a single, annular, second fixed region 17, which defines the micro-actuator 2 externally.

Each of the first and second fixed arms 13, 14 carries a plurality of fixed electrodes 16 extending towards the respective movable arm 8 in a direction substantially perpendicular to the respective fixed arm 13, 14; in particular, the fixed electrodes 16 are interdigitated with the movable electrodes 9, forming, in known manner, a plurality of capacitors arranged in parallel with one another. The first and second fixed arms 13, 14, the fixed electrodes 16, and the regions 15 and 17 are also made of doped epitaxial polysilicon.

When suitable potential differences are applied between the fixed arms 13 and 14 and the movable arms 8, owing to the capacitive coupling, each movable arm 8 is subjected to a transverse force that tends to move it away from the respective arm 13, 14 with which it has less potential difference and to move it towards the other arm 14, 13 with a greater potential difference, bringing about rotation of the suspended mass 7, with resilient deformation of the springs 11.

Figure 3:
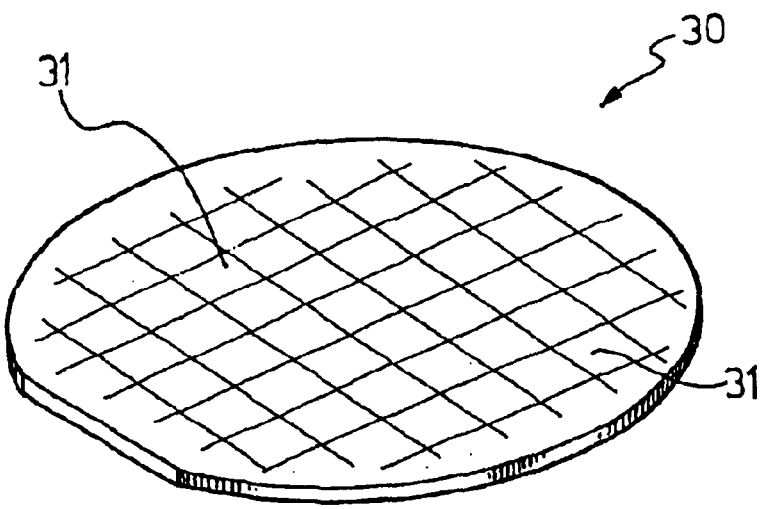
FIG. 3 is a schematic, perspective view of a semiconductor wafer on which a plurality of micro-actuators is formed.

With reference now to FIG. 3, this shows schematically and in perspective a silicon wafer 30, upon completion of the known processing steps which are necessary to produce a plurality of micro-actuators of the type described above and to incorporate the respective integrated control circuits. Each micro-actuator is formed, together with the respective integrated circuits, in a respective portion 31 of the wafer which, by cutting, will become a "die".

Figure 4A:
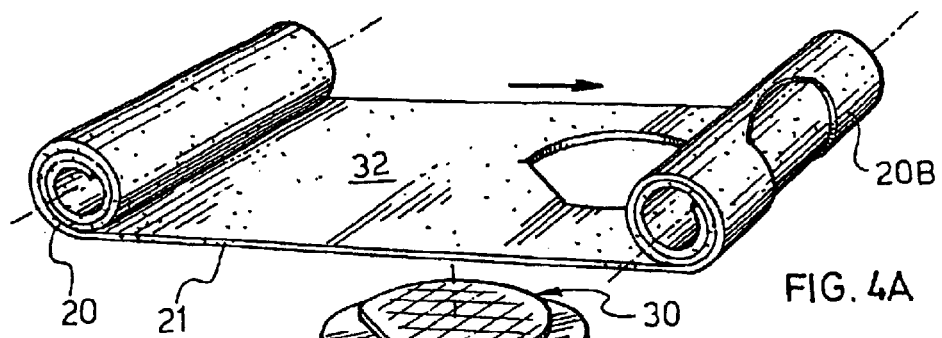
Figure 4B:
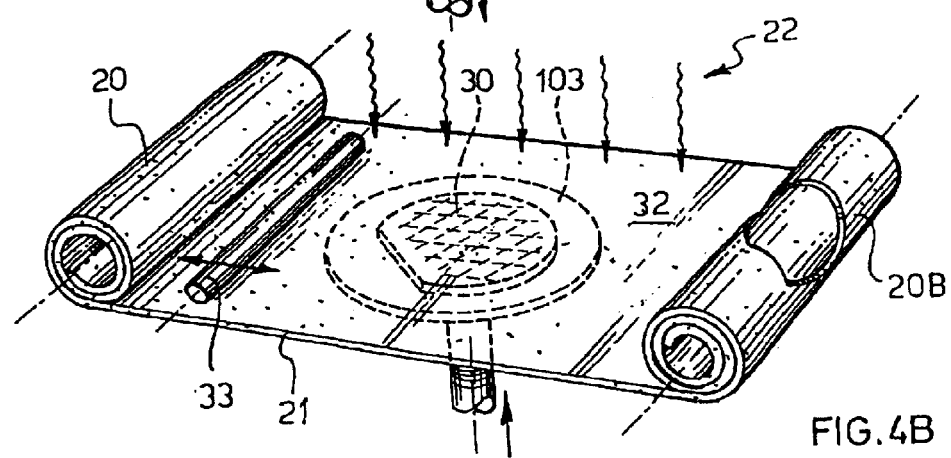
Figure 4C:
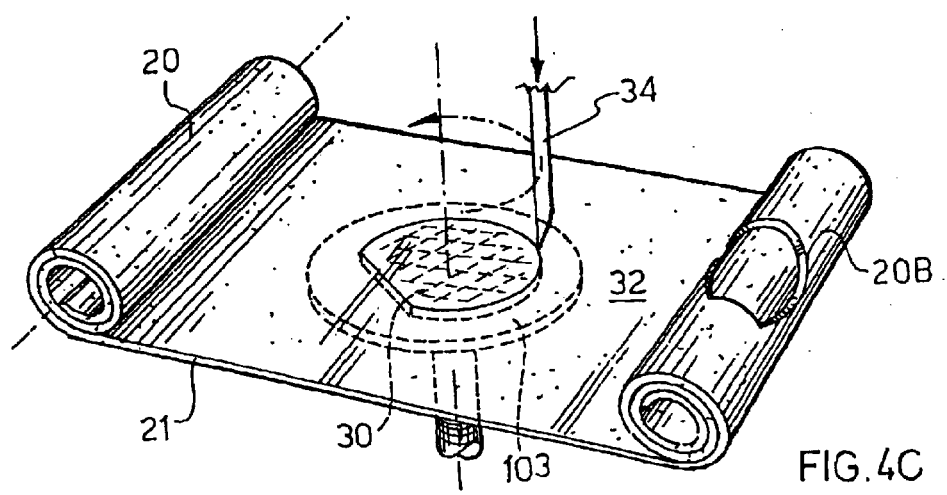

After the micro-actuators and the respective integrated circuits have been subjected to electrical reliability checks and tests, as shown in FIGS. 4A–4C, a thin adhesive film ("sticky foil") 32, for example, a photosensitive resin forming part of the line of DUPONT products known as RISTON® is extended, dry, over the front of the wafer 30, without the need for processes that use substances in the liquid phase. This thin film, which is wound on a supply roll 20 and is stretched between the supply roll 20 and a collection roll 20B, has an adhesive side 21. The semiconductor wafer 30 is placed on a vertically-movable support surface 103 (FIG. 4A) As shown in FIG. 4B, when the support surface 103 is raised, the front of the semiconductor wafer 30 is brought into contact with the adhesive side 21 of the thin film 32. The operation is performed at a temperature preferably of 110–120° C., the film 32 being heated by means of a hot air-flow 22, and the film 32 is caused to adhere to the front of the wafer 30 by means of a pressure roller 33. Then, as shown in FIG. 4C, a cutting blade 34 cuts the film 32, following the perimeter of the wafer, so as to separate the portion of film 32 which has adhered to the front of the wafer 30. The thin film 32 does not follow the topography of the front of the wafer, that is, it does not penetrate the cavities of the underlying layers.

The thickness of the substrate of the wafer 30 is reduced by lapping of the rear of the wafer 30, bringing the thickness, for example, to a value of approximately 100 m, so that the micro-actuator can be inserted between the slider 2 and the gimbal 3.

An adhesive film (sticky foil) 35 which is adhesive on both sides (FIG. 5) is then extended over the rear of the wafer, again dry, the adhesive layer of the film which is placed in contact with the rear of the wafer being photolabile. The double-sided adhesive film may, for example, be a film of material commonly used during the cutting of the wafer into dies. The method of application of the double-sided adhesive film is substantially similar to that described for the application of the thin film 32.

Figure 5:
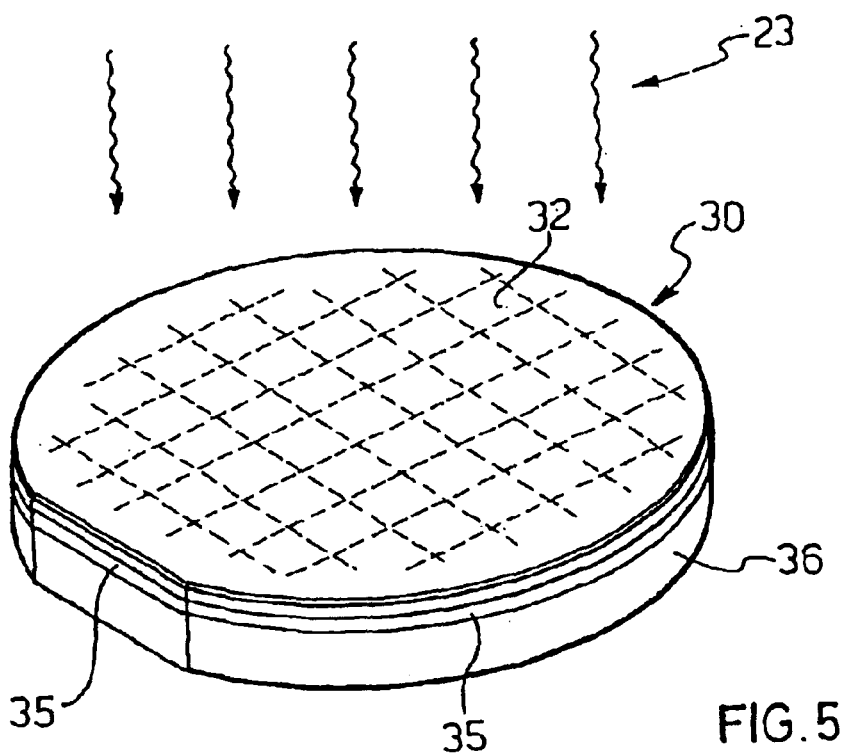

A support 36 for the subsequent processing of the wafer 30 is then stuck to the exposed surface of the double-sided sticky foil 35; the support 36 is preferably a piece of transparent material, for example, glass (FIG. 5). The thickness of the support 36 is such as to permit standard processing of the sandwich formed by the wafer 30, the double-sided sticky foil 35, and the support 36; a suitable support is constituted, for example by a piece of glass approximately 500 m thick.

If desired, oxygen-plasma etching (schematically indicated 23 in FIG. 5) may be performed to reduce the thickness of the sticky foil 32 on the front of the wafer 30, bringing it from about 15 m to about 5–8 m. The oxygen-plasma etching may be performed by placing the wafer 30 in a conventional "stripper".

Figure 6:
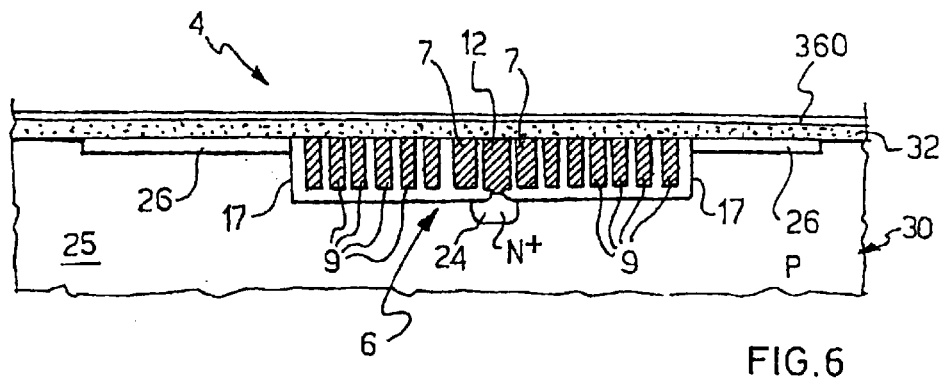

With reference now to the sectioned view of FIG. 6, which shows schematically a section taken in a radial plane VI—VI of the micro-actuator of FIG. 2, it is possible to see a buried N+ region 24 formed in a p-type silicon layer 25, and in contact with the polysilicon pillar 12 in order to polarize the rotor 6. The buried N+ region 24 is formed by N+ doping prior to the epitaxial growth of the polysilicon which forms the micro-actuator. Circuits for driving the micro-actuator 4, which are incorporated in the p-type layer 25 peripherally relative to the micro-actuator 4, are schematically indicated with reference numeral 26. It is important to note that the sticky foil 32 covers the rotor 6, immobilizing it without, however, penetrating the cavities of the structure.

A mask (a "hard mask") is formed on the sticky foil 32 by the deposition ("sputtering"), preferably cold or in any case at a temperature sufficiently low to be compatible with the sticky foil 32, of a layer 360 of a material that has high selectivity in relation to subsequent etching, for example, RIE etching in $O_2$ plasma, which defines the final geometry. This layer 360 may, for example, be silicon dioxide or aluminum, for example, about 2 m thick (FIG. 6).

Figure 7:
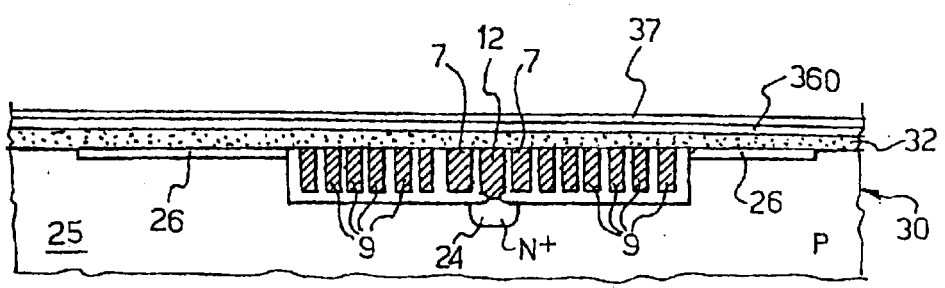

A layer of standard photosensitive resin 37 is then deposited on the layer 360 (FIG. 7), for example, by a conventional "spin coating" process.

Figure 8:
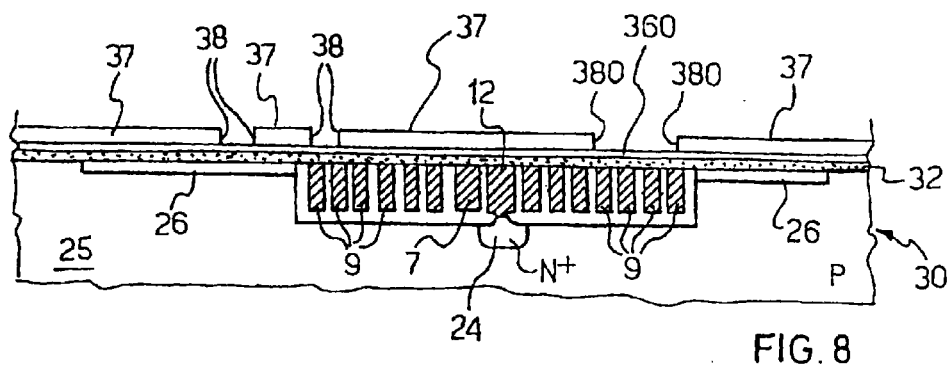

The layer of photosensitive resin 37 is exposed selectively to radiation by means of a conventional mask, and the exposed layer 37 is then developed and selectively removed by a standard process, in order to open windows 38, which will become areas for the anchoring of suspended conductors for the electrical connection of the slider, and a window 380 above the rotor where an area for the anchorage of a fixing plate (a "cap layer") of the slider (FIG. 8) will be formed. It is important to note that, during the development of the photosensitive resin 37, there is no infiltration of liquids into the cavities of the rotor (the cavities between the movable electrodes 9, between these and the fixed electrodes 16, and between the movable arms 8 and the fixed arms 13, 14) since, at this stage, the rotor 6 is completely covered and protected by the sticky foil 32.

Figure 9:
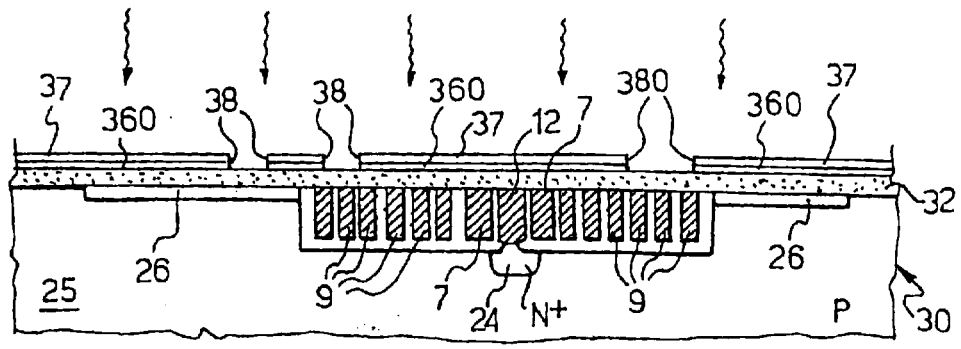

The silicon dioxide or aluminum layer 360 is then etched selectively, preferably by an RIE technique, and is removed in the region of the windows 38, 380 previously formed in the photosensitive resin layer 37 (FIG. 9). As a result of this etching, a hard mask remains on the sticky foil 32 and is constituted by the portions of the layer 360 which have not been removed since they are protected by the layer of photosensitive resin 37.

Figure 10:
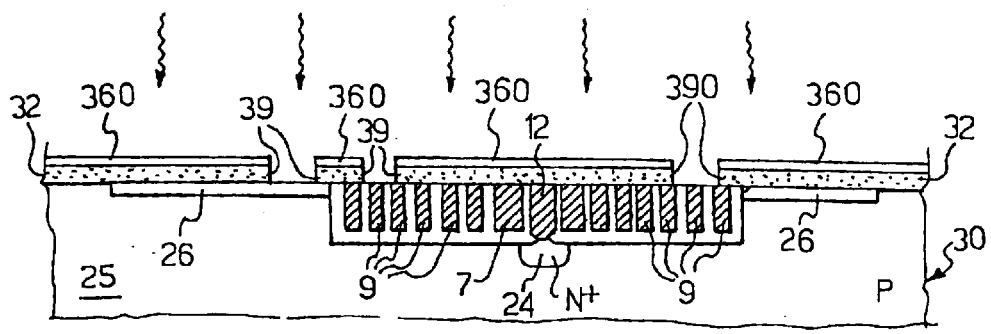

The photosensitive resin 37 is then completely removed and the sticky foil 32 is then etched selectively, where it is not protected by the hard mask 360, in order to form windows 39, 390 therein, as shown in FIG. 10. Preferably, the etching of the sticky foil 32 is oxygen-plasma etching and terminates when the surface of the wafer 30 is reached.

The reason why a hard mask is used for the selective removal of the sticky foil 32 is that, with a conventional photolithographic technique, that is, a technique utilizing the photosensitivity properties of the sticky foil, it would not be possible to define sufficiently small geometrical shapes. Clearly, however, in applications in which it is not necessary to define particularly small geometrical shapes, it will be possible to utilize the photosensitivity properties of the sticky foil 32 without the need to use a hard mask.

Figure 11:
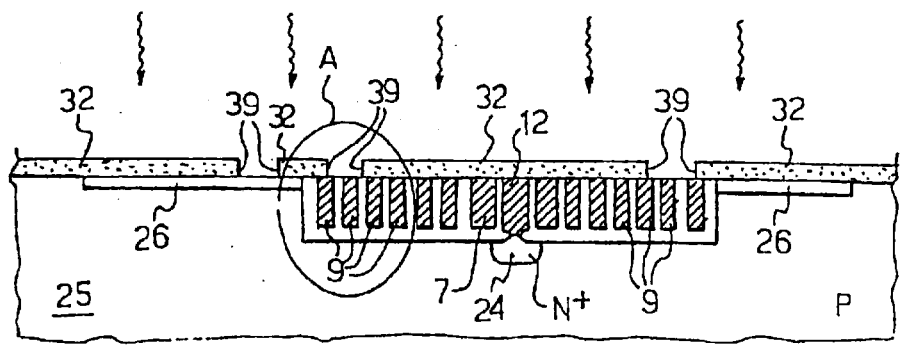

The silicon dioxide or aluminum hard mask 360 is completely removed by subsequent etching, preferably by an RIE technique (FIG. 11).

Figure 12:
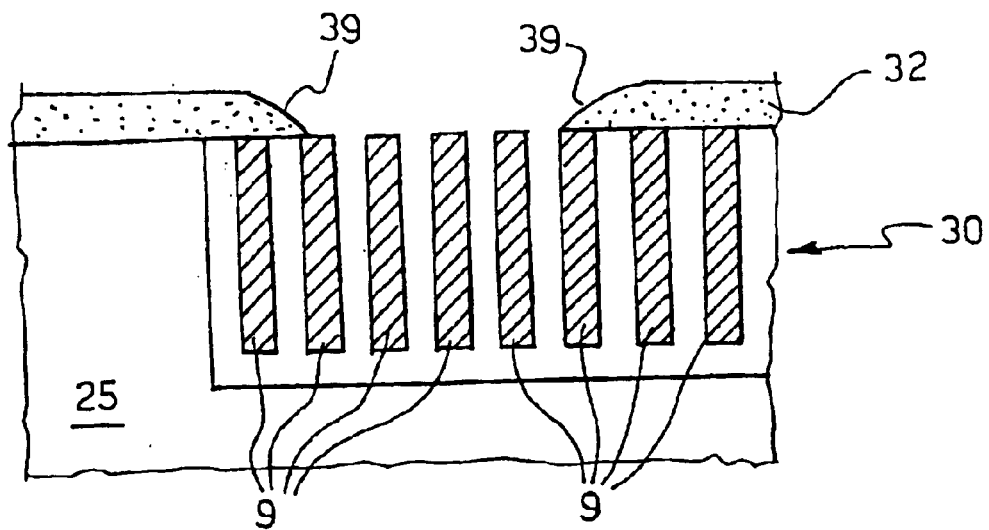

With reference now to FIG. 12, which show's the detail A of FIG. 11 on an enlarged scale, it is possible to see one of the windows 39 formed in the sticky foil 32.

Figure 13:
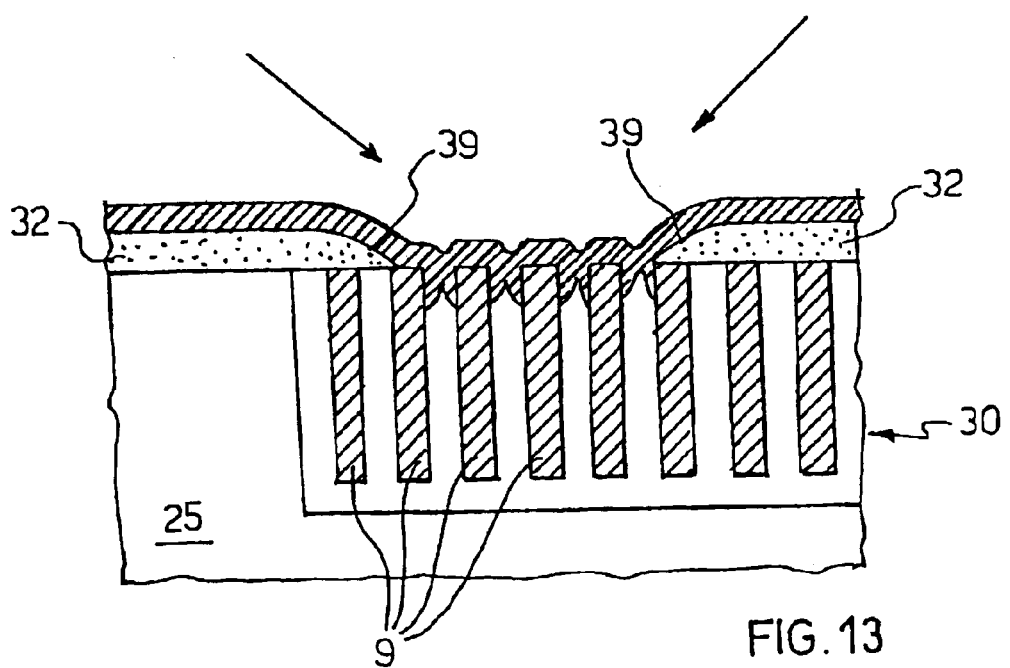

After a quick annealing ("flash annealing") heat treatment to cause the sticky foil 32 to reflow, an insulating dielectric layer 40, preferably of silicon dioxide, alumina ($Al_2O_3$), or another suitable material, is deposited. The dielectric layer 40 is deposited at low temperature, preferably with a thickness of about 3–4 m, with a deposition angle of about 60°–70°, symmetrically with respect to the perpendicular to the surface of the wafer 30. As a result, although the dielectric layer 40 covers the window 39 and seals the tops of the cavities of the micro-actuator 4 (for example, the cavities between the movable electrodes 9), it does not penetrate the cavities, but remains purely on the surface (FIG. 13). This is important since, if the layer 40 were to penetrate deeply, the rotor would be blocked since it would be practically impossible to remove the material which had penetrated.

Figure 14:
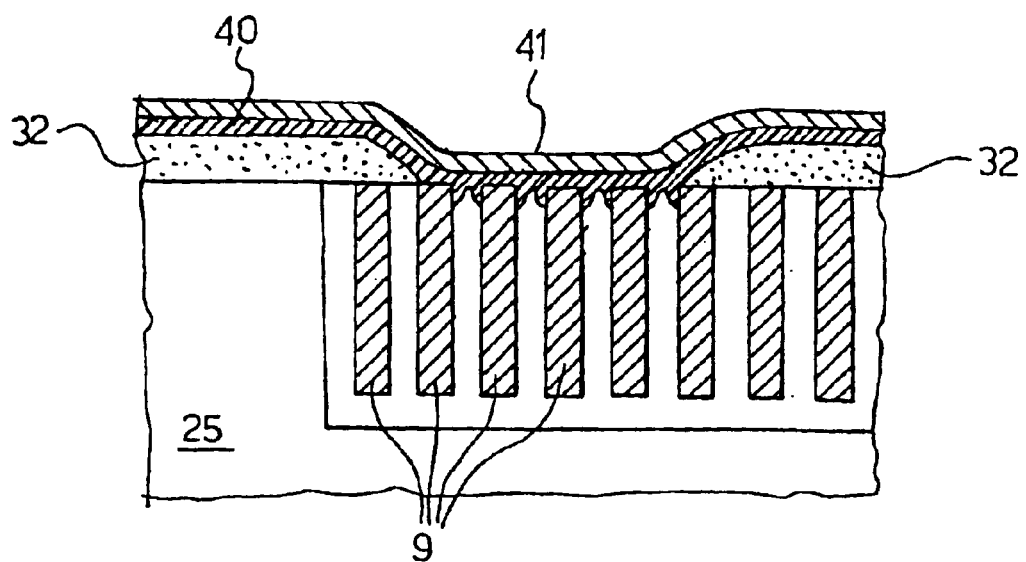

A layer of conductive material 41, for example, aluminum or gold or a multiple layer comprising a layer of aluminum, for example about 2 m thick and a layer of gold, for example, about 500 Å thick, is then deposited. The conductive layer 41 is deposited by sputtering at low temperature, preferably below 90° C. (FIG. 14). A multiple layer composed of 3–4 m of the dielectric layer 40 and about 2 m of the conductive layer 41 is thus produced on the sticky foil 32. This multiple layer is attached well to the rotor by virtue of the presence of the dielectric layer 40, and is also mechanically strong.

Figure 15:
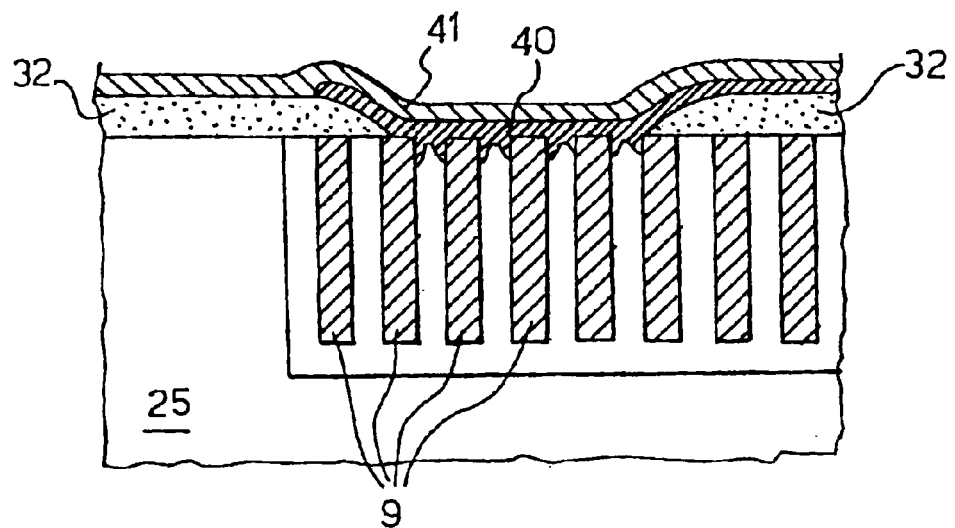

Alternatively, before the layer of conductive material 41 is deposited, the dielectric layer 40 may be selectively removed from the surface of the sticky foil 32 by a conventional photolithography and etching process in the regions in which suspended connection elements which do not require great stiffness are to be formed, for example, where suspended electrical conductors for the electrical connection of the slider are to be formed (FIG. 15). However, the dielectric layer 40 is preferably left on the remaining portion of the rotor where the fixing plate (the "cap layer") for the slider is to be formed.

A layer of standard photosensitive resin is then deposited and is subsequently exposed to radiation through a mask. The photosensitive resin is then developed. It should be noted that the photosensitive-resin development process does not give rise to any risk of infiltration of the development solution, since the rotor is well protected by the sticky foil 32 and by the layers 40 and 41; neither is there a risk of the sticky foil 32 being etched since it is covered by the dielectric layer 40 and by the conductive layer 41.

Figure 17:
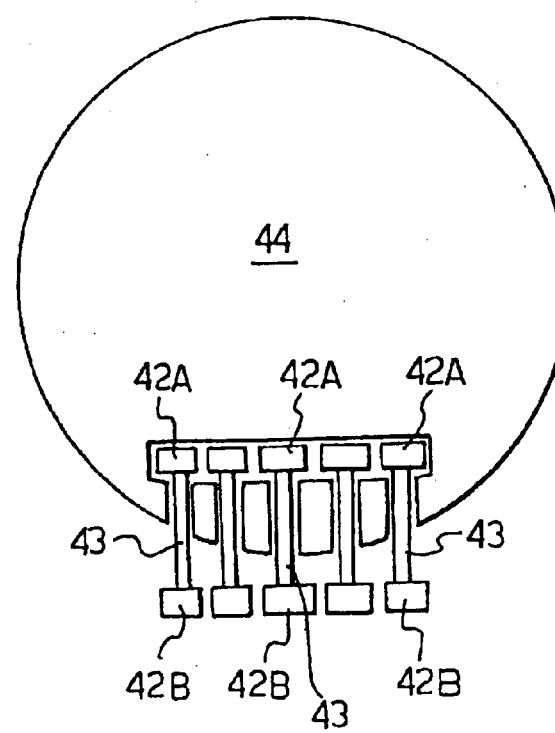
FIGS. 4 to 18 show successive steps of a method according to an embodiment of the invention for the electrical and mechanical connection of a reading/writing transducer to a micro-actuator of the type shown in FIG. 2.
Figure 16:
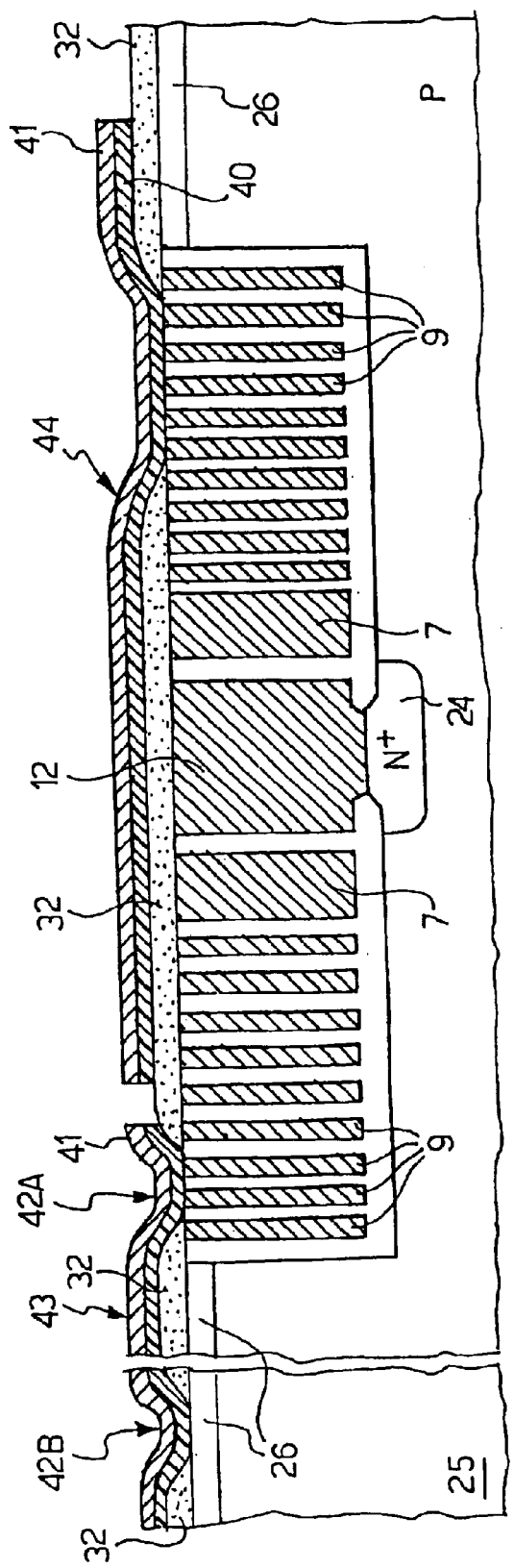

After the development of the photosensitive resin, the layer of conductive material 41 is removed selectively (FIG. 16) to define, as also shown in FIG. 17, pads 42a anchored to the rotor for the soldering of the electrical terminals of the slider, suspended electrical conductors 43 which lead from the pads 42A to fixed pads 42B to which electrical wires will be soldered, and the cap layer 44 on which the slider will be placed and fixed. The etching of the conductive layer 41 involves a first etch back to remove the gold layer and then an RIE etch to remove the aluminum layer. The dielectric layer 40 is also selectively removed. The RIE etching of the aluminum stops at the sticky foil 32.

The layer of photosensitive resin used to define the conductive layer 41 is then removed, for example, by etching in oxygen plasma.

All of the steps described up to now are performed on the entire wafer 30 before it is cut into individual dice.

At this point, with the glass support 36 still adhering to the rear of the wafer 30, the wafer 30 is divided into the individual dice by cutting. The glass support 36 is preferably not cut so that it can be reused.

The glass support 36 is then detached by being exposed to UV rays, by virtue of the photo-lability of the adhesive layer of the film 35, which is in contact with the wafer 30. During these operations, the rotors of the various micro-actuators are also well protected both mechanically and against infiltrations of water during the division into dice by virtue of the presence of the sticky foil 32.

Figure 18:
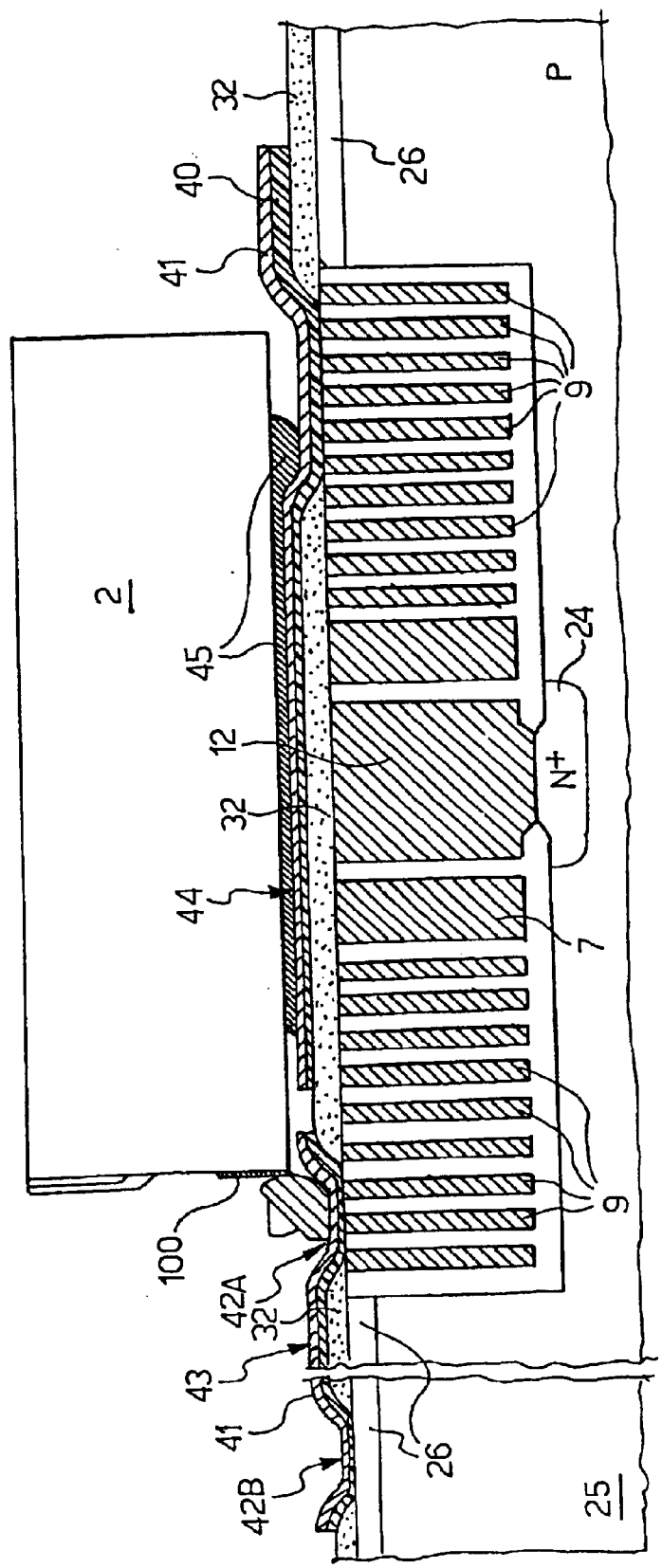

With reference to FIG. 18, the respective slider 2 for each die is then mounted on the micro-actuator 4.

The slider 2 is glued to the cap layer 44 in accordance with a standard method with the use of a layer of glue 45 that can be cured by UV. This step may be performed manually or automatically. The terminals 100 of the slider are then soldered, by the "ball bonding" technique, to the pads 42A of the suspended conductors 43 fixed to the rotor. Electrical wires are then soldered to the pads 42B.

The die with the slider 2 already mounted is then glued to the gimbal 3a of FIG. 1, again by gluing with the use of a glue that can be vulcanized by UV. Finally, electrical wires for connection between the electrical tracks on the suspension plate and the pads of the die are then soldered.

An alternative to the method described above provides for the die with the micro-actuator to be glued to the gimbal 3a before the slider 2 is mounted, the slider being glued to the cap layer 44 only subsequently. The electrical terminals 100 of the slider are then soldered to the pads 42A on the rotor and the electrical wires are soldered to the pads of the die.

As an alternative to the two techniques described above, the sliders 2 may be mounted on the respective micro-actuators by gluing the sliders 2 to the respective cap layers 44 even before the wafer 30 is divided into individual die. The electrical terminals 100 of the sliders are then soldered to the pads 42A on the rotors. The wafer is then divided into the individual die and the unit is mounted on a gimbal. The electrical wires for connection to the electrical tracks on the suspension plate are then soldered to the pads of the die.

Upon completion of the mounting of the sliders on the dice with the micro-actuators and the respective gimbals, the sticky foil 32 is removed to release the rotors of the micro-actuators. A bath with a concentration of about 1.5% by weight of NaOH may be used this purpose, the gimbal being immersed in the bath for a few minutes. The assembly is then rinsed with water and then with water to which alcohol has been added, and is finally dried under vacuum at a temperature of about 120° C.

Alternatively, the sticky foil 32 may be removed by etching in oxygen plasma. This method has the advantage of reducing the damage brought about by the "stiction" effect that may arise during the drying stage with the technique described above.

Figure 19:
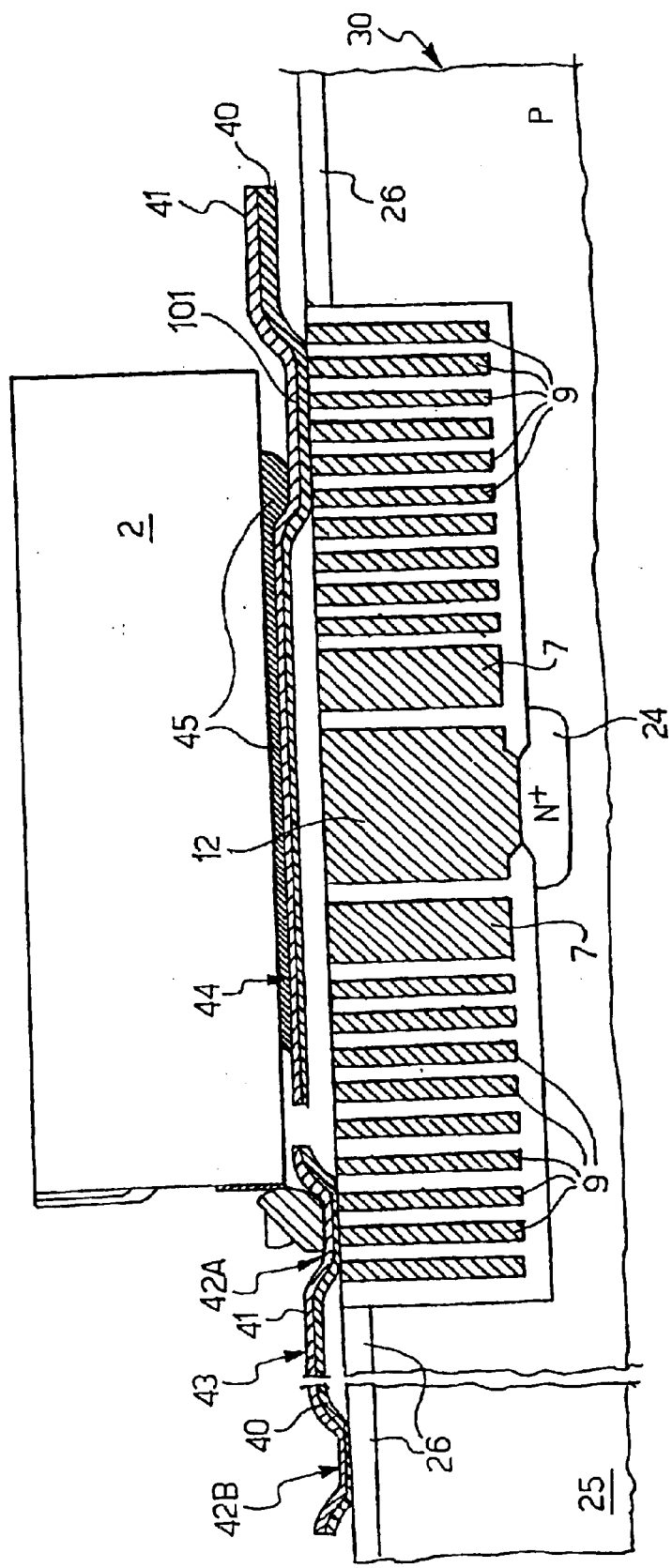
FIG. 19 shows, in section, the reading/writing transducer mounted on the respective micro-actuator.

The structure of FIG. 19 is thus obtained; the cap layer 44 is suspended above the rotor and anchored thereto at 101; the conductors 43 are suspended between the rotor and the static portion of the micro-actuator and are anchored to the rotor in the region of the pads 42A and to the static portion in the region of the pads 42B.

The suspended conductors 43 enable the slider to be connected electrically without preventing its movement, since they are flexible.

Figure 20:
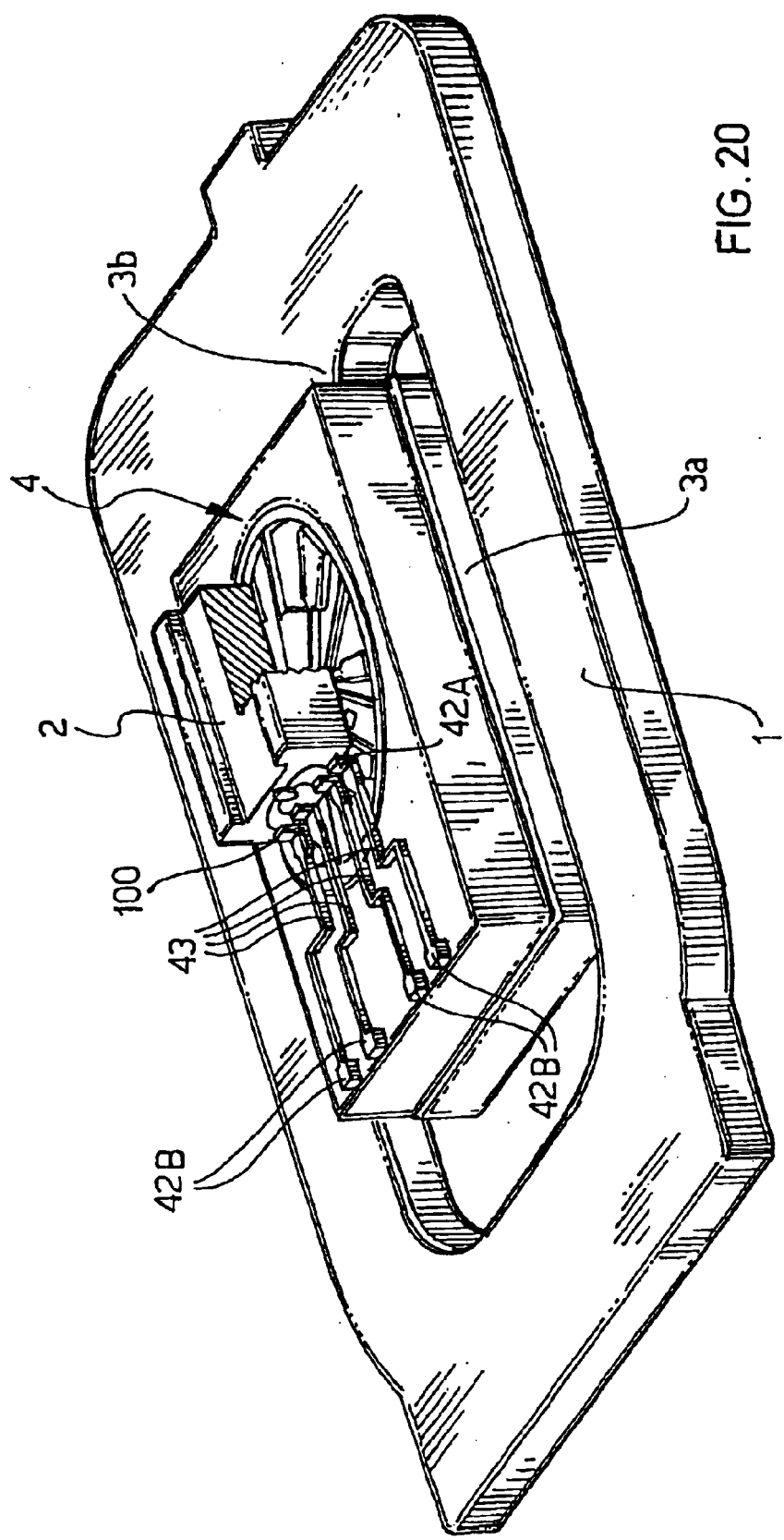
FIG. 20 is an axonometric view showing the reading/writing transducer and the respective micro-actuator mounted on the respective suspension element.

FIG. 20 is an axonometric view of the assembled 20 structure.

The method according to the present invention has a distinguishing feature that a sticky foil is used as a sacrificial material for the formation of suspended electrical connection elements and can be applied to the already-formed micro-actuator dry and hence not by processes for depositing photosensitive resin in the liquid phase, which would result in penetration of the photosensitive resin into the cavities of the micro-actuator, or of the micro-mechanism more generally.

A further advantage lies in the fact that the sticky foil can be removed by etching in oxygen plasma, which reduces the possibility of damage to the micro-actuator or to the micro-mechanism generally due to the phenomenon known as "stiction".

Another advantage of the method described lies in the fact that the mounting of the unit formed by the micro-actuator and the slider on the gimbal is fully compatible with normal assembly, soldering and testing techniques. That is, it is not necessary for hard-disk manufacturers to modify the techniques normally used in order to adapt them to the presence of the micro-actuator.

Clearly, variations and/or additions may be applied to the embodiments described and illustrated above.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

What is claimed is:

1. A method of producing suspended elements between two portions of a micro-mechanism containing components that move relative to one another on a semiconductor wafer, the method comprising:

applying the adhesive side of a dry film over the micro-mechanism on the semiconductor wafer to immobilize the moveable components without penetrating any cavities therein;

forming a mask on the dry film;

depositing, developing, and selectively removing a sacrificial layer from the mask and the dry film to form windows on the dry film, the dry film protecting the cavities from infiltration of liquids during the developing step;

opening the windows by selectively etching the dry film;

depositing a dielectric layer to cover the windows without penetrating any underlying cavities;

depositing a conductive layer that is attached to at least one moveable portion of the micro-mechanism; and selectively removing the conductive layer and the dielectric layer, and removing the dry film to form electrical connection elements suspended between the two portions of the micro-mechanism containing components that move relative to one another.

2. The method of claim 1, wherein the thin film is applied to the front surface of the semiconductor wafer.

3. The method of claim 1, wherein the thin film comprises a film of dry photosensitive resin.

4. The method of claim 3, wherein the thin film is of the type known commercially by the name RISTON®.

5. The method of claim 1, wherein the micro-mechanism comprises an electrostatic micro-actuator used for the fine positioning of a reading/writing transducer in a hard-disk reading/writing unit.

6. The method of claim 1, wherein forming the mask comprises depositing a layer of silicon dioxide or aluminum on the film at low temperature and selectively removing the sacrificial layer comprises selectively removing the silicon dioxide or aluminum layer by a photolithographic technique.

7. The method of claim 1, further comprising, gluing a respective reading/writing transducer onto each component and soldering terminals of the transducer to the electrical connection elements of the respective micro-mechanism, and then dividing the semiconductor wafer with the transducers mounted by cutting it into a plurality of individual dice.

8. The method of claim 1, wherein applying the adhesive side of a dry film further comprises reducing the thickness of the wafer after the dry film has been applied.

9. The method of claim 1, wherein applying the adhesive side of a dry film comprises a subsequent step of applying a second adhesive layer to a back surface of the semiconductive wafer, the second adhesive layer having an exposed adhesive surface.

10. The method of claim 1, further comprising removing the dry film to release the moveable components.

11. The method of claim 10, further comprising, after selectively removing the conductive layer and the dielectric layer and before removing the dry film:

dividing the wafer into dice;

attaching a slider to each die;

gluing the die and the attached slider to a gimbal; and attaching wires to the die.

12. The method of claim 11, further comprising the mounting of a respective reading/writing transducer on each die.

13. The method of claim 10, wherein removing the dry film comprises removing the dry film by oxygen plasma etching.

14. The method of claim 10, wherein removing the dry film comprises removing the dry film by immersion in a bath of NaOH.

* * * * *